US011677930B2

(12) United States Patent
Keserich

(10) Patent No.: US 11,677,930 B2
(45) Date of Patent: Jun. 13, 2023

(54) METHOD, APPARATUS, AND SYSTEM FOR ALIGNING A VEHICLE-MOUNTED DEVICE

(71) Applicant: HERE GLOBAL B.V., Eindhoven (NL)

(72) Inventor: Brad Keserich, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 106 days.

(21) Appl. No.: 16/228,183

(22) Filed: Dec. 20, 2018

(65) Prior Publication Data

US 2020/0202566 A1 Jun. 25, 2020

(51) Int. Cl.
| | |
|---|---|
| *H04N 17/00* | (2006.01) |
| *G06T 7/80* | (2017.01) |
| *G06T 7/00* | (2017.01) |
| *B60R 11/04* | (2006.01) |
| *G06V 20/56* | (2022.01) |

(Continued)

(52) U.S. Cl.
CPC ............ *H04N 17/002* (2013.01); *B60R 11/04* (2013.01); *G06T 7/0002* (2013.01); *G06T 7/80* (2017.01); *G06V 10/245* (2022.01); *G06V 20/56* (2022.01); *G06V 30/274* (2022.01); *H04N 23/64* (2023.01); *B60R 2011/0026* (2013.01); *B60R 2011/0033* (2013.01); *G06T 2200/24* (2013.01); *G06T 2207/20081* (2013.01);

(Continued)

(58) Field of Classification Search
CPC ..... G06T 7/80; G06T 7/0002; G06T 2200/24; G06T 2207/20081; G06T 2207/30168; G06T 2207/30244; G06T 2207/30252; G06T 7/10; G06T 5/50; G06T 7/246; G06T 2207/10021; G06T 7/85; B60R 11/04; B60R 2011/0026; B60R 2011/0033; G06K 9/00791; G06K 9/726; G06K 9/209; H04N 5/23222; H04N 17/002; H04N 13/246; G05D 2201/0213; G01C 21/3602; G01C 21/32; G01S 7/4802; G06N 3/08
See application file for complete search history.

(56) References Cited

U.S. PATENT DOCUMENTS 9,491,450 B2 11/2016 Kussel
9,794,552 B1 * 10/2017 Ribble ................. H04N 17/002
(Continued)

FOREIGN PATENT DOCUMENTS

WO 2018000037 A1 1/2018

OTHER PUBLICATIONS

Itu et al., "Automatic Extrinsic Camera Parameters Calibration Using Convolutional Neural Networks", Conference Paper, Sep. 2017, 6 pages.

*Primary Examiner* — Jianxun Yang
(74) *Attorney, Agent, or Firm* — Ditthavong, Steiner & Mlotkowski

(57) ABSTRACT

An approach is provided for determining an optimal alignment of a device. The approach, for example, involves receiving image data from a device mounted in a vehicle. The approach also involves presenting an alignment template in a user interface of the device as an overlay on the image data, wherein the alignment template provides one or more guidelines indicating a target alignment of the device to capture images from the vehicle for an application. The approach further involves processing the image data against the alignment template to determining an alignment of the device in relation to the target alignment.

20 Claims, 12 Drawing Sheets

(51) Int. Cl.
*G06V 30/262* (2022.01)
*H04N 23/60* (2023.01)
*G06V 10/24* (2022.01)
*B60R 11/00* (2006.01)

(52) U.S. Cl.
CPC ............... *G06T 2207/30168* (2013.01); *G06T 2207/30244* (2013.01); *G06T 2207/30252* (2013.01)

(56) References Cited

U.S. PATENT DOCUMENTS

| | | | |
|---|---|---|---|
| 2006/0184297 A1* | 8/2006 | Higgins-Luthman | ............... B60W 40/04 701/41 |
| 2007/0165909 A1* | 7/2007 | Leleve | ............... G06T 7/80 382/104 |
| 2014/0168377 A1* | 6/2014 | Cluff | ............... H04N 13/246 348/47 |
| 2014/0232871 A1* | 8/2014 | Kriel | ............... H04N 5/2259 348/148 |
| 2017/0256068 A1* | 9/2017 | Wang | ............... G06T 7/74 |
| 2018/0026669 A1 | 1/2018 | Edwards et al. | |
| 2019/0163990 A1* | 5/2019 | Mei | ............... G01C 21/3602 |
| 2019/0228235 A1* | 7/2019 | Murad | ............... G06V 20/56 |

\* cited by examiner

METHOD, APPARATUS, AND SYSTEM FOR ALIGNING A VEHICLE-MOUNTED DEVICE

BACKGROUND

Modern location-based applications and services require highly accurate and updated digital map data across geographic areas. The digital map data (e.g., imagery data) is collected from a variety of sources to detect, triangulate and track various landmarks/features in a geographic area. One of the sources on which map service providers rely is the imagery data collected from users' electronic devices based on their movement such as, on their drives in vehicles. The electronic device (e.g., a mobile phone) is mounted in a vehicle and imagery data is captured by using a camera of the electronic device. The captured imagery data is used, for instance, by the map service providers to update the digital map data. However, poor initial installation or movement of the vehicle as it travels on roads can shift the orientation of the camera. As a result, the camera is more likely to capture imagery that is not suitable for map making or other location services (e.g., off road-scene imagery data like images of the sky or hood of the vehicle) during the drives.

SOME EXAMPLE EMBODIMENTS

Therefore, there is a need for an approach for determining an optimal alignment of a device mounted in a vehicle to maximize usefulness of incoming imagery data.

According to one embodiment, a computer-implemented method for determining an optimal alignment of a device comprises receiving image data from a device mounted in a vehicle. The method also comprises presenting an alignment template in a user interface of the device as an overlay on the image data. The alignment template provides one or more guidelines indicating a target alignment of the device to capture images from the vehicle for an application. The method further comprises processing the image data against the alignment template to determining an alignment of the device in relation to the target alignment.

According to another embodiment, an apparatus for determining an optimal alignment of a device comprises at least one processor, and at least one memory including computer program code for one or more computer programs, the at least one memory and the computer program code configured to, with the at least one processor, cause, at least in part, the apparatus to receive image data from a device mounted in a vehicle. The apparatus is further caused to present an alignment template in a user interface of the device as an overlay on the image data. The alignment template provides one or more guidelines indicating a target alignment of the device to capture images from the vehicle for an application. The apparatus is further caused to process the image data against the alignment template to determining an alignment of the device in relation to the target alignment.

According to another embodiment, a non-transitory computer-readable storage medium for determining an optimal alignment of a device carries one or more sequences of one or more instructions which, when executed by one or more processors, cause, at least in part, an apparatus to receive image data from a device mounted in a vehicle. The apparatus is also caused to present an alignment template in a user interface of the device as an overlay on the image data. The alignment template provides one or more guidelines indicating a target alignment of the device to capture images from the vehicle for an application. The apparatus is further caused to process the image data against the alignment template to determining an alignment of the device in relation to the target alignment.

According to another embodiment, an apparatus for determining an optimal alignment of a device comprises means for receiving image data from a device mounted in a vehicle. The apparatus also comprises means for presenting an alignment template in a user interface of the device as an overlay on the image data. The alignment template provides one or more guidelines indicating a target alignment of the device to capture images from the vehicle for an application. The apparatus further comprises means for processing the image data against the alignment template to determining an alignment of the device in relation to the target alignment.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining an optimal alignment of a device in a vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
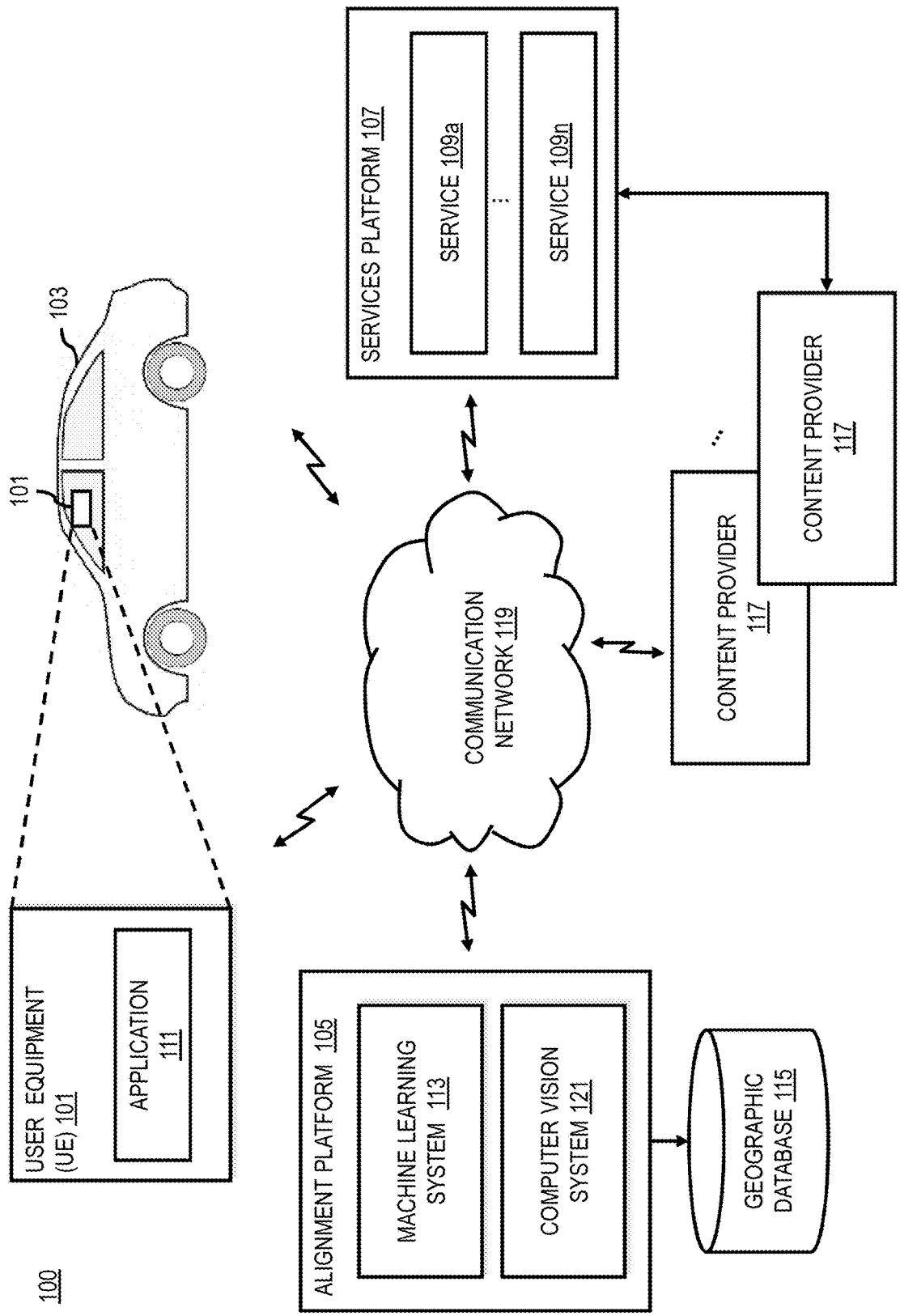
FIG. 1 is a diagram of a system capable of determining an optimal alignment of a device in a vehicle, according to one embodiment.

FIG. 1 is a diagram of a system capable of determining an optimal alignment of a device (e.g., a user equipment (UE) 101 such as a camera-equipped smartphone) in a vehicle 103, according to one embodiment. As discussed above, digital maps (e.g., as stored in a geographic database 115) are widely used in location-based services and applications such as transportation, guidance, search and rescue, etc.; and therefore need map data to be up-to-date in higher resolution with higher accuracy. Generally, map service providers rely on imagery data received from various sources for providing the accurate and up-to-date digital maps to its consumers.

One such source is a mobile device of a user (e.g., the UE 101). As the user is moving (e.g., driving a vehicle), a dash cam or a camera of the mobile device captures images on the surroundings to determine features such as road signs, road paint, buildings, poles and so forth. These captured images are processed and stored in a database. For example, the UE 101 may include a perception stack comprising a computer vision system (e.g., using machine learning based image recognition) to capture imagery and then to ingest the imagery so that it can detect, triangulate, and/or track various landmarks or features such as road-paint, signs, poles, etc. These processed images may then aid the map service providers to create digital maps at a much larger scale. In an exemplary scenario, a user mounts the UE 101 (e.g., mobile phone) on a rear-view mirror or other mounting location in the vehicle 103 with the UE 101's camera facing forward to the road the road to capture imagery data (e.g., images of road signs, poles, etc.) and transmit it to map service providers to update the digital map data.

In the above scenario, the orientation of the UE 101 (e.g., user's cell phone) on their rear-view mirrors or other vehicle mounting location will likely have a large impact on the perception stack algorithms used to perform detections, aggregate observations, and ultimately to produce maplets for keeping the digital map data as up-to-date and correct as possible. In order to offload some of the work from the perception stack of the UE 101 (e.g., offload any processing needed to compensate for poor camera orientation or alignment), which is already heavily constrained due to the target hardware, and to maximize the usefulness of the incoming imagery, it may be necessary to put the phone into a certain (near) optimal alignment. A simple example of why this is important might be to observe that if the system 100 is reliant on road-scene imagery coming from the UE 101's front-facing camera, yet the UE 101 is tilted up so that its camera captures nothing but sky or the hood of the car, the captured imagery might be effectively useless for detecting road-paint, signs, poles, etc.

Therefore, ensuring that the UE 101 is initially mounted in an optimal or close to optimal orientation for collecting useful imagery (e.g., useful with respect to digital map making) presents significant technical challenges. Even if the initial orientation of the UE 101 is optimal or near optimal, maintaining that orientation or alignment over time also presents significant technical challenges. For example, drives taken by a vehicle 103 in which the UE 101 is mounted typically are not completely smooth, and any movement of the vehicle 103 may cause the UE 101 to be knocked out of alignment, possible without the driver noticing for a large portion of the drive or image capture session. Due to the misalignment, the camera captures off road-scene imagery data such as sky or hood of a vehicle, which renders the imagery data and therefore produces consistent dark zones in the digital maps.

To address these technical challenges and problems, the system 100 of FIG. 1 introduces a capability to perform an alignment of a device (UE 101) mounted in the vehicle 103 using machine learning (e.g., a machine learning system 113 such as a deep neural network) to understand a scene in the captured imagery and then to recognize when the alignment is correct (e.g., matches an optimal alignment within a target threshold). More specifically, in one embodiment, given a UE 101 (e.g., camera equipped smartphone or equivalent device) and an application 111 (e.g., application available to an end user or consumer) to be executed on the UE 101, the system 100 can include a mode of operation in the application 111 that allows for an initial mounting alignment (e.g., initial rear-view mirror phone alignment) and periodic alignment checks. In one embodiment, the initial alignment can be aided by a template matching the hood of the vehicle 103 (or any other photo-identifiable alignment feature). In one embodiment, both the initial and periodic alignments can be performed by the machine learning system 113 (e.g., deep neural network) to identify the relevant alignment features and their optimal alignments or orientations within the scene depicted in captured imagery. The optimal alignments or orientations, for instance, correspond to a an image perspective or scene that will be useful for map making (e.g., have an orientation that can produce imagery of relevant map features such as road point, signs, poles, etc.).

In other words, in one embodiment, the system 100 determines an optimal alignment of a UE 101 (interchangeably referred to as a device 101) in a vehicle 103 so that imagery data received from the device 101, or the incoming imagery data can be efficiently used by map service providers to update the digital map with higher accuracy and in high resolution. In one embodiment, the system 100 receives imagery data from the device 101 mounted within the vehicle 103 (e.g., via a computer vision system 121). Further, the system 100 presents an alignment template to align the device 101 in a correct alignment. The imagery data received from the device 101 is then processed against the alignment template to determine whether an alignment of the device 101 is correct or not, using for instance, the machine learning system 113 (e.g., a deep neural network or equivalent machine learning model such as but not limited to a support vector machine, Random forest, decision trees, etc.). In this way, the system 100 can determine an alignment of the device 101 so that accurate imagery data is captured by the device 101 via the machine learning system 113, which further results in efficient processing of the imagery data to produce high resolution images to update the digital maps.

The embodiments of the system 100 provide several advantages over conventional approaches. For example, most other vehicle mounted cameras or dash cameras are either statically mounted and calibrated/adjusted at the time of mounting or are adjustable but do not utilize any sophisticated on-board processing, including alignment checking and aid. In contrast, the embodiments described herein provide a technical solution to the misalignment problem where most other products this responsibility to manual alignment procedures to be performed manually by the user or a professional static alignment team.

Figure 2:
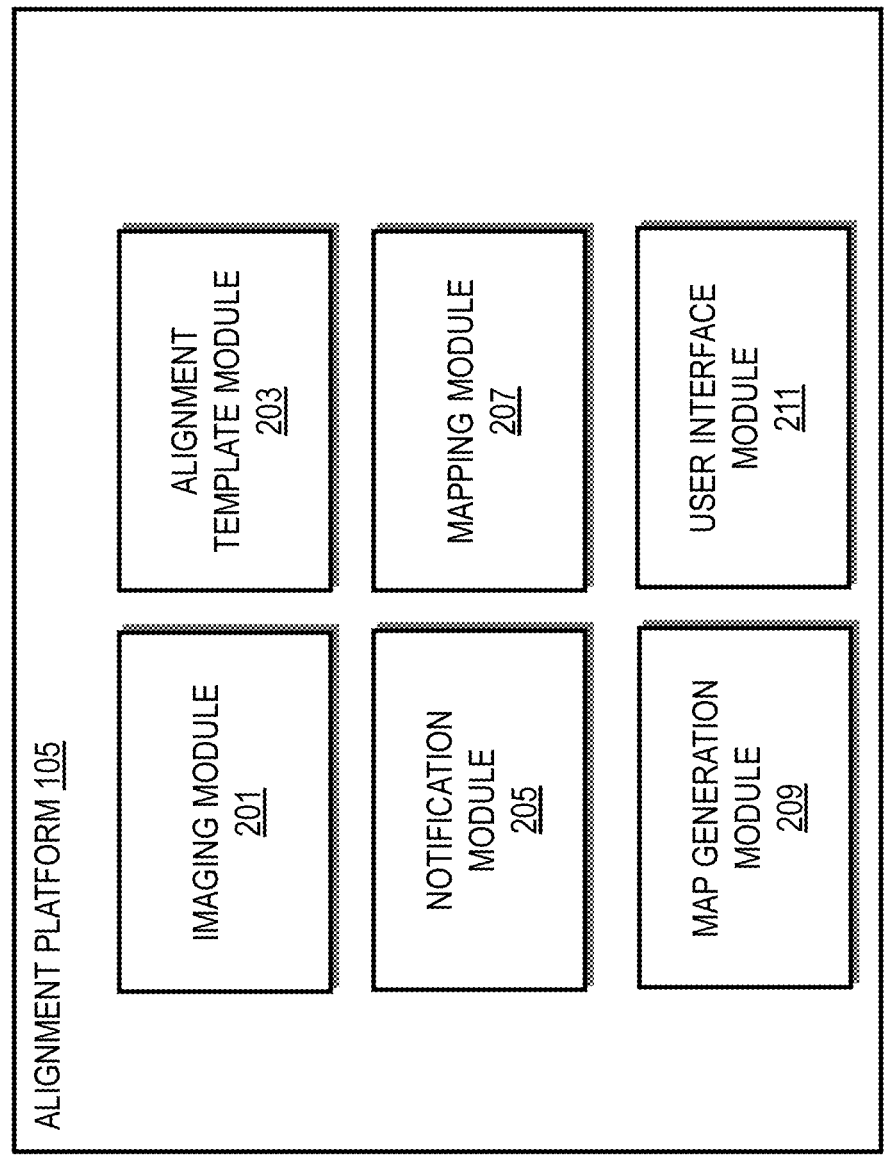
FIG. 2 is a diagram of components of an alignment platform capable of determining an optimal alignment of a device in a vehicle, according to one embodiment.

In one embodiment, as shown in FIG. 2, an alignment platform 105 includes one or more components for determining an optimal alignment of the device, according to the various embodiments described herein. It is contemplated that the functions of these components may be combined or performed by other components of equivalent functionality. In this embodiment, the alignment platform 105 includes an imaging module 201, an alignment template module 203, a notification module 205, a mapping module 207, a map generation module 209 and a user interface module 211. In addition, the alignment platform 105, the UE 101, and/or the application 111 executing on the UE 101 can include a perception stack comprising the machine learning system 113 and computer vision system 121 for performing alignment of the UE 101 mounted in the vehicle 103 alone or in combination with the other modules described herein. The above presented modules and components of the alignment platform 105 can be implemented in hardware, firmware, software, or a combination thereof. Though depicted as a separate entity in FIG. 1, it is contemplated that the alignment platform 105 may be implemented as a module of any other component of the system 100 (e.g., a component of the services platform 107, services 109*a*-109*n* (also collectively referred to as services 109), the vehicle 103, the device 101, an application 111 executing on the device 101, etc.). In another embodiment, one or more of the modules 201-211 may be implemented as a cloud based service, local service, native application, or combination thereof. The functions of the alignment platform 105 and the modules 201-211 are discussed with respect to FIGS. 3-5 below.

Figure 3:
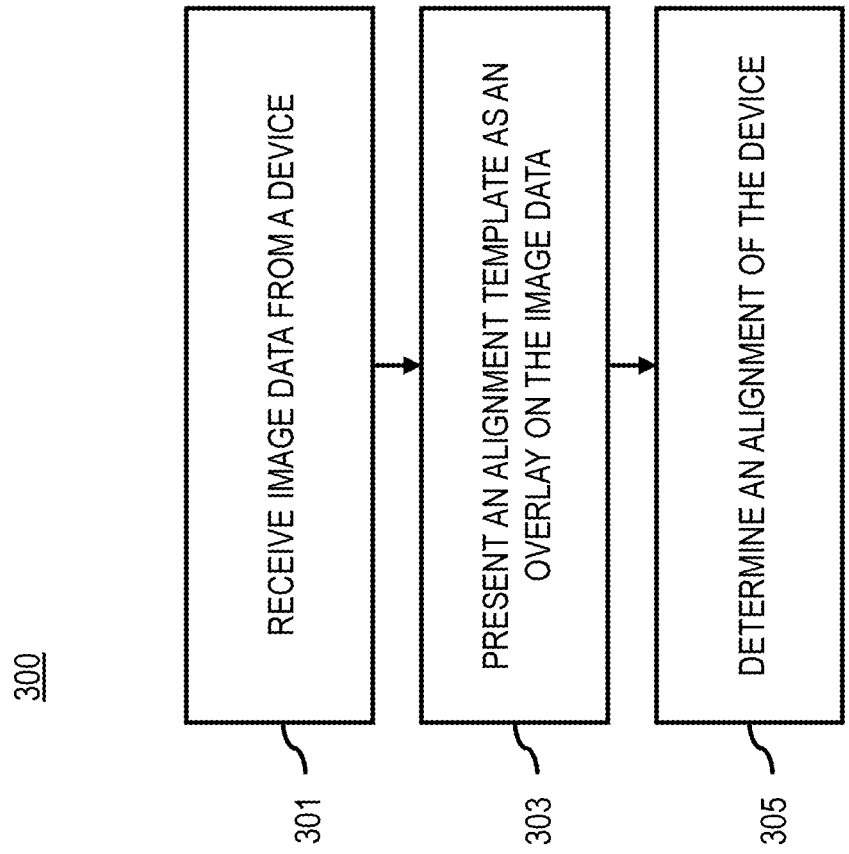
FIG. 3 is a flowchart of a process for determining an optimal alignment of a device in a vehicle, according to one embodiment.
Figure 4:
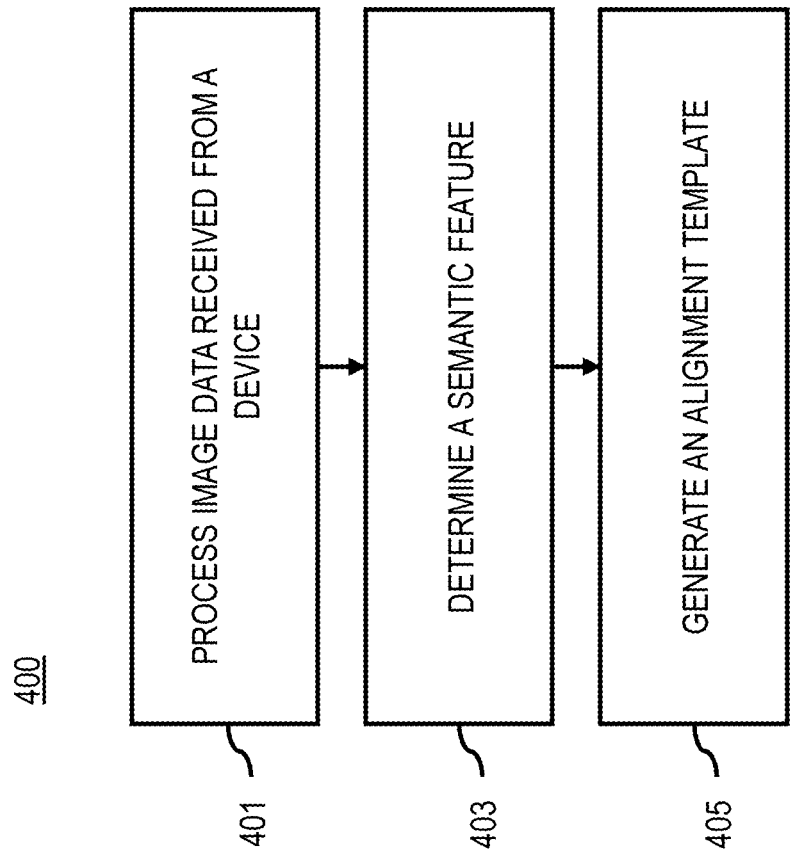
FIG. 4 is a flowchart of a process for generating an alignment template for a device in a vehicle, according to one embodiment.
Figure 5:
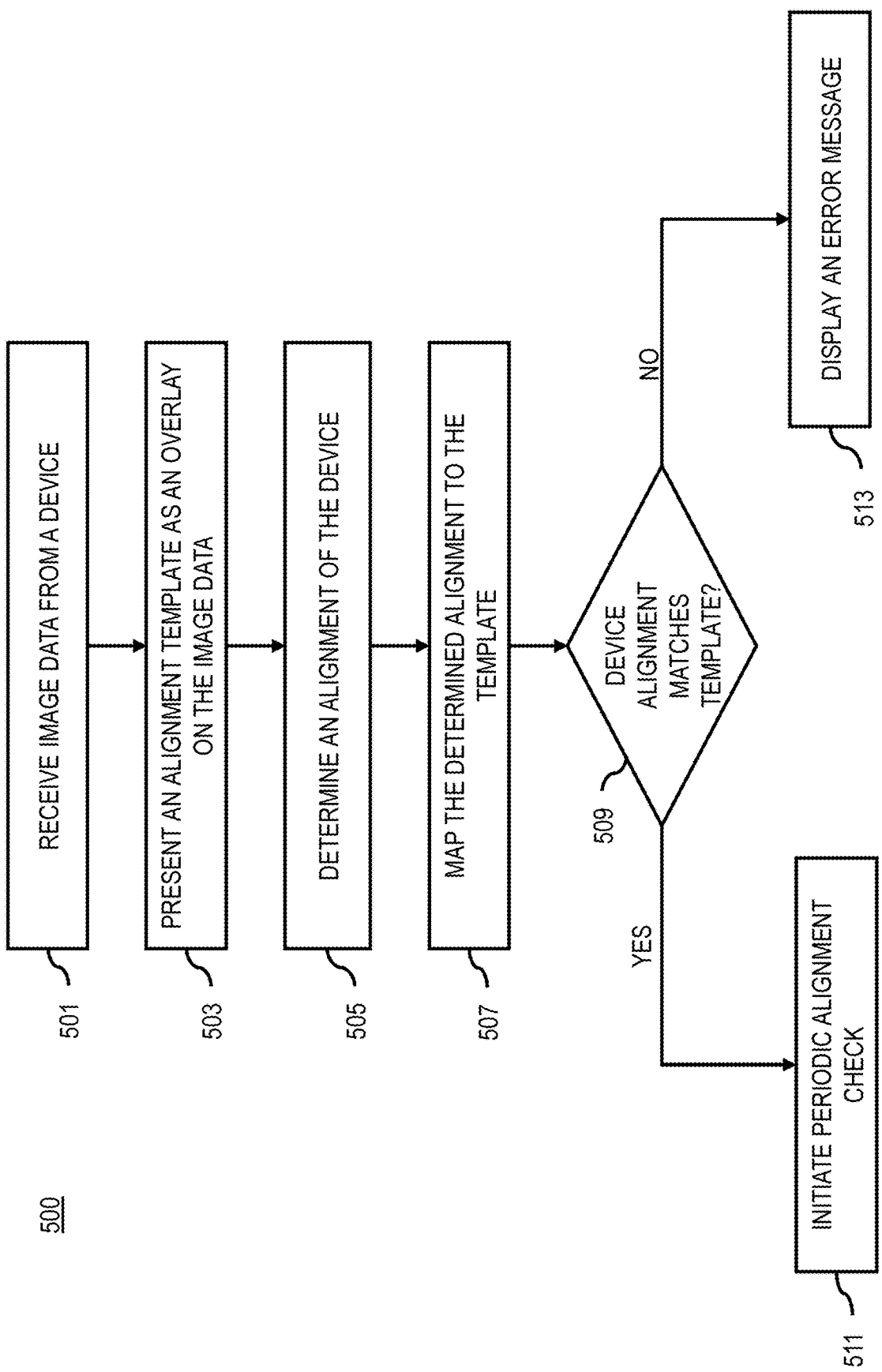
FIG. 5 is a flowchart of a process for determining an optimal alignment of a device in a vehicle, according to another embodiment.
Figure 11:
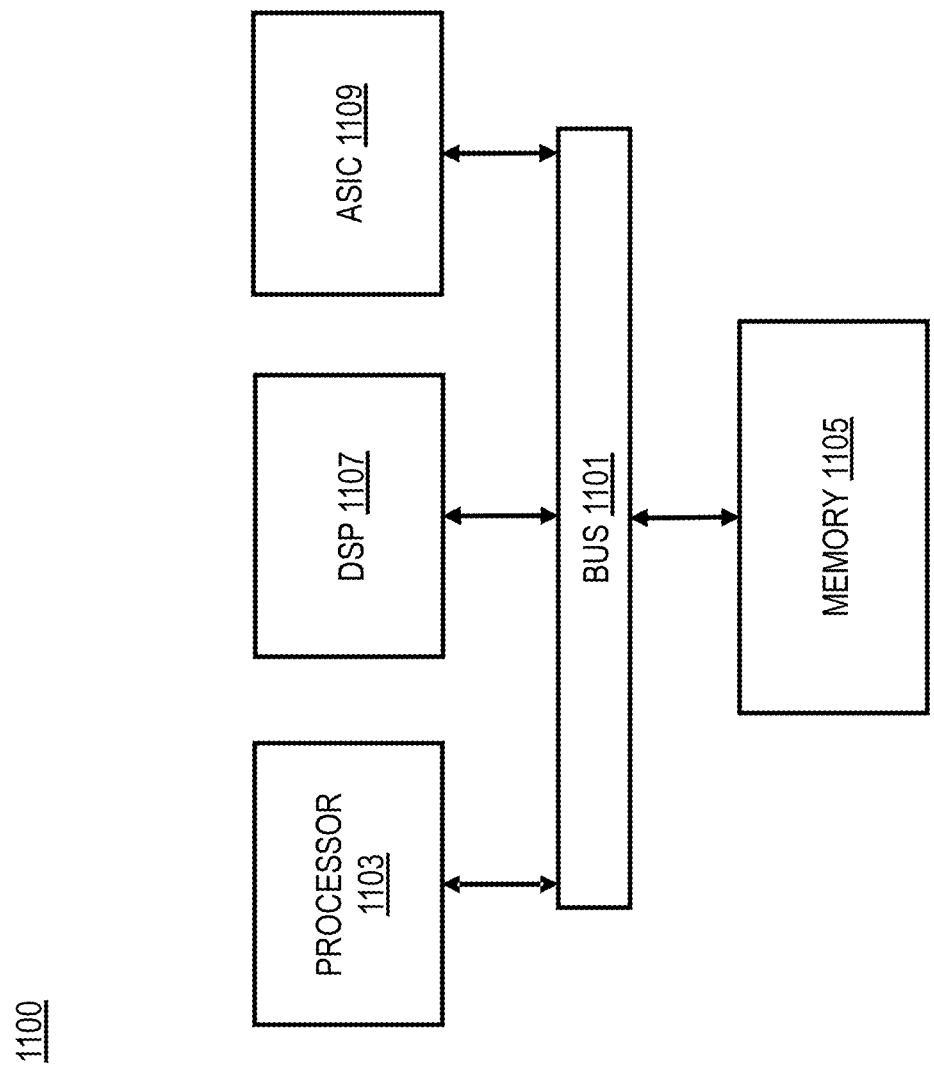
FIG. 11 is a diagram of a chip set that can be used to implement an embodiment.

FIGS. 3-5 are flowcharts of processes 300, 400 and 500 for determining an optimal alignment of a device in a vehicle, according to one embodiment. More specifically, the embodiments of the processes 300, 400 and 500 can be used to train a machine learning model of the system 100 to determine an optimal alignment of the device in a vehicle by generating an alignment template for the device 101. In various embodiments, the machine learning system 113 and/or any of the modules 201-211 of the alignment platform 105, any of the modules 201-211, machine learning system 113, and/or computer vision system 121 may perform one or more portions of any of the processes 300, 400 and 500 and may be implemented in, for instance, a chip set including a processor and a memory as shown in FIG. 11. As such, the alignment platform 105, any of the modules 201-211, machine learning system 113, and/or computer vision system 121 can provide means for accomplishing various parts of the processes 300, 400 and 500, as well as means for accomplishing embodiments of other processes described herein in conjunction with other components of the system 100. Although the processes 300, 400 and 500 are illustrated and described as a sequence of steps, its contemplated that various embodiments of the processes 300, 400 and 500 may be performed in any order or combination and need not include all of the illustrated steps.

As discussed above, in one embodiment, the alignment platform 105 accomplishes the processes 300, 400 and 500 of determining an optimal alignment of a device in a vehicle.

In one embodiment, the operation of the processes 300 and 400 can be summarized as follows:

Retrieve imagery data (e.g., from a device 101) for an area of interest (step 301);

Process the imagery data (step 401);

Determine one or more semantic features from the processed imagery data (step 403);

Generate an alignment template (step 405);

Present the alignment template as an overlay on the imagery data (step 303); and Determine an alignment of the device (step 305).

Embodiments of the processes 300 and 400 are described below.

In step 301, the imaging module 201 captures image data (interchangeably referred to as imagery data) of an area of interest (e.g., a front view) of the device 101. As described above, the area of interest can be captured by the device 101 in a vehicle 103. In one embodiment, the device 101 can be, but not limited to, a mobile phone, a camera, a dash cam, etc. In one embodiment, the device 101 can be mounted on a rear view mirror of the vehicle 103 facing out through a windshield in order to capture a font view of the vehicle 103. In another embodiment, the device 101 can be mounted on a receptacle or other attached to inside of the vehicle 103 (e.g., on a rear-view mirror or other mounting location). The device 101 can be mounted in a front facing position in order to capture a larger geographic area (e.g., many square meters or more) in front of the vehicle 103. An example of a captured front view of the vehicle 103 is illustrated in the FIG. 6. The device 101 may include sensors such as orientation sensors (e.g., accelerometers, gyroscopes, magnetometers, etc.), image sensors (e.g., charge-coupled devices (CCDs), complementary metal-oxide-semiconductor (CMOS) chips combined with processing devices to capture images, etc.), and so forth. The sensors may have the capability to measure orientation and/or capture imagery data in one dimension, two dimension or three dimensions. In one embodiment, the sensors may be integral to the device 101. In another embodiment, the sensors may be connected to a processing device that fed the incoming imagery data to the device 101.

In step 303, after receiving the imagery data from the device 101, the alignment template module 203 presents an alignment template in a visual display of the device 101. The presentation of the alignment template is explained in conjunction with FIG. 4.

In one embodiment, the operation of the process 400 can be summarized as follows:

Process the imagery data (step 401);
Determine one or more semantic features from the processed imagery data (step 403); and
Generate an alignment template (step 405).

Embodiments of the process 400 are described below.

In step 401, the alignment template module 203 processes the incoming imagery data received from the imaging module 201. In one embodiment, the incoming imagery is a current image or image stream being collected by the camera sensor of the device 101 (e.g., images representing a live view of the device 101). These images are captured with the device 101 having a current orientation (e.g., pointing direction) that is to be evaluated for correct or optimal alignment. In one embodiment, the incoming imagery can be provided directly from the imaging module 201 or via an intermediate cache or database. Live or current imagery refers to imagery that can been captured and made available for processing within a designated period of time (e.g., from milliseconds, seconds, etc.) that is designated or otherwise accepted as live.

Further, in step 403, the alignment template module 203 determines one or more semantic features of the scene depicted in the incoming imagery data. In one embodiment, the semantic features may be, but not limited to, a hood of the vehicle 103, lane markings, road signs, towers, poles, and so forth. The determination of the semantic features may be performed by using the machine learning system 113. In one embodiment, the machine learning system 113 may include a deep neural network to make predictions from the machine learning models. In other words, the processing of the incoming imagery includes using a trained machine learning model (e.g., a deep neural network) to detect or recognize any semantic feature identifiable in the imagery can that be used as an alignment. In general, semantic features that are candidates for alignment features are those features that typically have a static relative position with respect to the ground or other map reference point. For example, the hood or other feature of the vehicle 103 that may be visible from a front facing camera (e.g., windshield frame, top of the dashboard, windshield wipers, etc.) can also be detected as semantic features according to the embodiments of step 403. Accordingly, when an input to the trained machine learning model is imagery data used for in the embodiments described herein, the output can include a classification or identification of semantic features that are present in the input image and may be used to determine an alignment of the device 101 in the vehicle 103. In one embodiment, the output can also include the pixels or pixel locations of the input image corresponding to the detected semantic features.

In step 405, the alignment template module 203 generates an alignment template. In one embodiment, the alignment template module 203 generates the alignment template based on the determined semantic features from the incoming imagery data and their respective locations in the image data. The alignment template module 203 may generate the alignment template by using the machine learning system 113, in one embodiment. The machine learning system 113 may use parameters associated with the device 101 and/or the vehicle 103, determined semantic features, or a combination thereof in order to generate the alignment template to be displayed on the visual display of the device 101. The parameters associated with the device 101, such as a camera, may be, but not limited to, optimal, geometric and/or digital characteristics, for example, a location, an orientation, focal length, plane and/or pixel coordinates, or a combination thereof of the device 101. The parameters of the vehicle 103 may be, but not limited to, a hood of the vehicle, a frame of the vehicle, a dashboard, a car seat, or so forth. The generated alignment template may include guidelines indicating a target alignment of the device 101. The target alignment may be defined as an optimal alignment of the device in which the device captures useful imagery data from the device 101 at an acceptable orientation.

In one embodiment, the machine learning system 113, for instance, may include a machine learning model (e.g., deep neural network) that has been trained on ground truth image data labeled to indicate whether the corresponding known camera alignments of the ground truth images are useful map making or other location based services. In this way, the trained machine learning model will be configured to classify the set of parameters extracted from the input image (i.e., an input feature set) with respect to whether or not the images are useful for a location-based service or application. In one embodiment, the machine learning model is further trained to identify the locations of the detected semantic or alignment features within the image that optimizes a prediction accuracy (e.g., minimizes cross-entropy loss). The predicted image or pixel locations of the detected semantic or alignment features corresponding to the best prediction accuracy can then be used construct guidelines of the alignment template. In one embodiment, the guidelines in the alignment template may be displayed as crosshairs in the user interface of the device 101. The guidelines may be used to align the device 101 in a correct position or alignment at an initial alignment mode of operation.

In one embodiment, the alignment template module 203 operates in two modes of operation: initial alignment mode and an periodic alignment check mode. During the initial alignment mode of operation, the alignment template such as guidelines may be presented as an overlay on the incoming imagery data displayed on the visual display of the device 101. The initial alignment mode of operation is a mode in which a user of the device 101 manually aligns the device 101 with respect to a target alignment of the device 101 indicated by the alignment template while configuring an application on the device 101 for the first time to capture the incoming imagery data from the device 101. In one embodiment, the initial check can be performed each time that the device 101 is detected to be mounted in the vehicle 103. For example, if the user removes the device 101 from the vehicle 103 after initial alignment, the device 101 can detect that it has been moved from its mount and then perform the initial alignment again when the device 101 is remounted to capture imagery for a location-based service (e.g., capturing images for digital map making).

In one embodiment, after completion of the initial check, the alignment template module 203 can an initiate periodic alignment check mode of operation, whereby the alignment of the device 101 is periodically verified to determine whether alignment remains within tolerance thresholds of the initial alignment. As described above, as the vehicle 103 drives, there is a potential that the device 101 can knocked, shaken, or otherwise moved so that its orientation is no longer optimal. Accordingly, the alignment template module 203 can periodically collect or sample images from the aligned UE 101 and then process the image against the alignment template to determined whether or note the UE 101 remains in alignment. If the checked alignment is outside of alignment tolerance thresholds, the alignment template module 203 can initial the full alignment process according to the embodiments described herein.

Returning to the process 300 to perform an initial or subsequent device alignment, in step 303, the alignment template module 203 with the help of the notification module 205 presents the generated alignment template on a user interface of the device 101. In one embodiment, the alignment template may be presented as an overlay on the incoming imagery data on the user interface in the initial alignment mode of operation of the application 111 executing on the device 101. For example, when a user is executing an application 111 for determining an optimal alignment of the device 101, then the notification module 205 presents the alignment template on a visual display of the device 101 displaying guidelines on a front view image captured from the inside of the vehicle 103. In the alignment template, guidelines such as cross hairs are displayed in the center as an overlay on the front view image being captured by the device 101. In one embodiment, the crosshairs may be displayed in, but not limited to, yellow color. In another embodiment, the guidelines may be displayed in any color.

Further, a data indication is provided by the notification module 205 when the alignment template matches with the target alignment during the initial alignment mode of operation. For example, an arrow near the cross hairs is displayed that aid the user to align the device 101 as per the target alignment required to capture the imagery data from the vehicle 103 during the initial alignment mode of operation. As the user moves the device 101 to align it as per the target alignment of the device 101, the alignment template module 203 can continue to capture and process images from the device 101 to compare against the alignment template. The comparison, for instance, can be performed by the machine learning system 113 using a machined learning model trained to classify alignments or matches between detected semantic features pixel locations and the pixel locations of the guidelines of the alignment template. Depending on whether the match or degree of difference between the pixel locations of the semantic features and their corresponding guidelines, the notification module 205 can change the colors or other representation of the arrow near the cross hairs. In an example, a red color arrow is visible at the current position of the device 101 when the device 101 is misaligned. As the user moves the device 101 to match the alignment with the target alignment, the color of the arrow changes to green. This indicates that the alignment of the device 101 matches with the target alignment within a threshold alignment value.

In one embodiment, a predefined threshold alignment value is defined, such that if the difference between the determined alignment of the device 101 with respect to the target alignment is less than a threshold alignment error then the user is not required to further align the device 101. The threshold alignment value may be, but not limited to, a numerical value that depicts correct and/or acceptable coordinates and/or position of objects of the imagery data while capturing the imagery data from the device 101. For example, if a threshold alignment value for an imagery data is 5, and the determined alignment value is 4.7 and a threshold alignment error is 0.5, then the difference between the threshold alignment value and the determined alignment value is 0.3, then the determined alignment is said to be an optimal alignment of the device 101.

Furthermore, the notification module 205 displays a data indication such as a circle at the top right of the user interface of the device 101. Similar to the arrow near the cross hairs, the circle changes color as per the orientation of the device 101. In one embodiment, when the alignment of the device 101 does not match with the target alignment, then the color of the circle may be shown as red. As the user moves the device 101 and the orientation matches with the target alignment or is within the alignment threshold value, the color of the circle changes to, but not limited to, green. In one embodiment, when both the data indicators such as, an arrow and a circle turns green then the data indication is provided, which states that the device 101 is in correct alignment and the initial alignment mode of operation of the device 101 is completed.

Further, at step 305, the mapping module 207 determines an optimal alignment of the device 101. The determination of the optimal alignment can be carried out by mapping the determined device alignment (during the initial alignment mode of operation) in relation to the target alignment by the mapping module 207. The mapping module 207 processes the imagery data against the alignment template using the machine learning system 113 to determine whether the alignment of the device 101 matches or is within the threshold alignment value. When it is determined that the determined alignment of the device 101 matched the target alignment then the mapping module 207 completes the initial alignment mode of operation for the device 101. The mapping module 207 may then activate the active alignment mode of operation. In one embodiment, the mapping module 207 may process the imagery data based on the parameters of the device 101, the vehicle 103, or a combination thereof. As discussed above, the processing of the imagery data may be performed by the machine learning system 113.

After completing the initial alignment mode of operation, the mapping module 207 sends a signal to the imaging module 201 to initiate capturing of additional image data from the device 101, in one embodiment. The additional image data may include, more images of the area of interest such as when the device 101 is still and/or moving a road (e.g., user is driving a car), images capturing surrounding the device 101 and/or vehicle 103. The mapping module 207 processes the captured image data by using the machine learning system 113, in one embodiment. The processing of the additional image data can be done in order to determine whether the quality of the additional image data meets a quality criterion associated with the application of the device 101. The quality criterion of the image data may be, but not limited to, sharpness, tone, color, contrast, exposure accuracy, noise, and so forth. In case it is determined that the quality of the additional image data meets image quality criterion of the application 111, then an active mode of operation for collecting application image data is initiated by the imaging module 201. The imagery data received by initiating the active mode of operation may then be stored in the geographic database 115. The stored imagery data may then be collected by the map generation module 209 to generate digital map data. The generated digital map data may then be provided to the user for navigation purposes, as per the requirement.

In case, the quality of the additional image data does not meet the quality criterion of the application then an error message may be displayed on the user interface of the device 101 by the notification module 205. Then, the user is required to reinitiate the initial alignment mode of operation in the application 111 and repeat the process 300 to determine the alignment of the device 101.

Further, as described above, the mapping module 207 initiates a periodic alignment check of the device 101 to determine whether the device 101 is capturing imagery data having its placement in the correct alignment. In one embodiment, the user of the device 101 may select a period from the application 111 in which the alignment check is to be conducted. The period of the alignment check may be, but not limited to, hourly, daily, every two days, weekly, bi-weekly, and so forth.

The user interface module 211 may operate in conjunction with the modules (e.g., imaging module 201, alignment template module 203, notification module 205, mapping module 207, map generation module 209, or combination thereof) to display data such as imagery data, alignment template, data indications (e.g., red or green arrows, or guidelines) and so forth on the visual display of the device 101.

FIG. 5 is a flowchart of a process 500 for determining an optimal alignment of a device in a vehicle, according to another embodiment.

In step 501, the alignment platform 105 receives imagery data from a device. The imagery data may be a scene of an area of interest. The imagery data may be captured by the device 101 such as, but not limited to, a mobile phone, a camera, a dash cam, etc. In one embodiment, the device 101 can be mounted on a rear view mirror of the vehicle 103 facing out through a windshield. In another embodiment, the device 101 can be mounted on a receptacle attached to inside of a windshield of the vehicle 103. The device 101 can be mounted in a front facing position in order to capture the area of interest.

In step 503, the alignment platform 105 presents an alignment template on a visual display of the device 101. The alignment template is presented as an overlay on the imagery data being captured by the device 101. In the alignment template, guidelines may be displayed on the visual display of the device 101 in order to align the device 101 in a correct orientation to capture clear imagery data.

Further, in step 505, the alignment platform 105 determines one or more semantic features from the captured imagery data in order to determine a current alignment of the device 101. The current alignment of the device 101 may include current position of the device 101 while capturing the imagery data. As discussed above, the semantic features may include, but not limited to, a hood of the vehicle 103, lane markings, road signs, towers, poles, and so forth.

In step 507, the alignment platform 105 maps the determined alignment of the device 101 with the alignment template. The mapping of the determined alignment of the device 101 with the alignment template may be carried based on the parameters of the device 101, the vehicle 103, or a combination thereof, as discussed in conjunction with FIG. 4.

In step 509, the alignment platform 105 determines whether the determined device alignment matches the alignment template. In case, the alignment platform 105 determines that the determined device alignment matches the alignment template, then the process 500 proceed to a step 511. Otherwise, the process 500 proceeds towards a step 513.

In step 511, the alignment platform 105 initiates a periodic alignment check for the device 101. The periodic alignment check is initiated to determine whether the device 101 is capturing the imagery data from a correct alignment when the user is using the application 111 for capturing the incoming imagery data. In one embodiment, the user of the device 101 may select a period from the application in which the alignment check is to be conducted. The period of the alignment check may be, but not limited to, daily, every two days, weekly, bi-weekly, and so forth.

In step 513, the alignment platform 105 displays an error message on a user interface of the device 101 that the alignment of the device is not correct and therefore the user is required to repeat the steps of initial alignment mode of operation in order to correct the alignment of the device 101 for capturing the imagery data. In one embodiment, the error message may be displayed by data indicators such as red colored arrows on the user interface and a red colored circle on the top right of the user interface. In other embodiment, other indicators such as, but not limited to, a text, an exclamation mark, and so forth, may be displayed on the user interface of the device 101 to indicate an error in the alignment of the device 101 in the vehicle 103.

Figure 6:
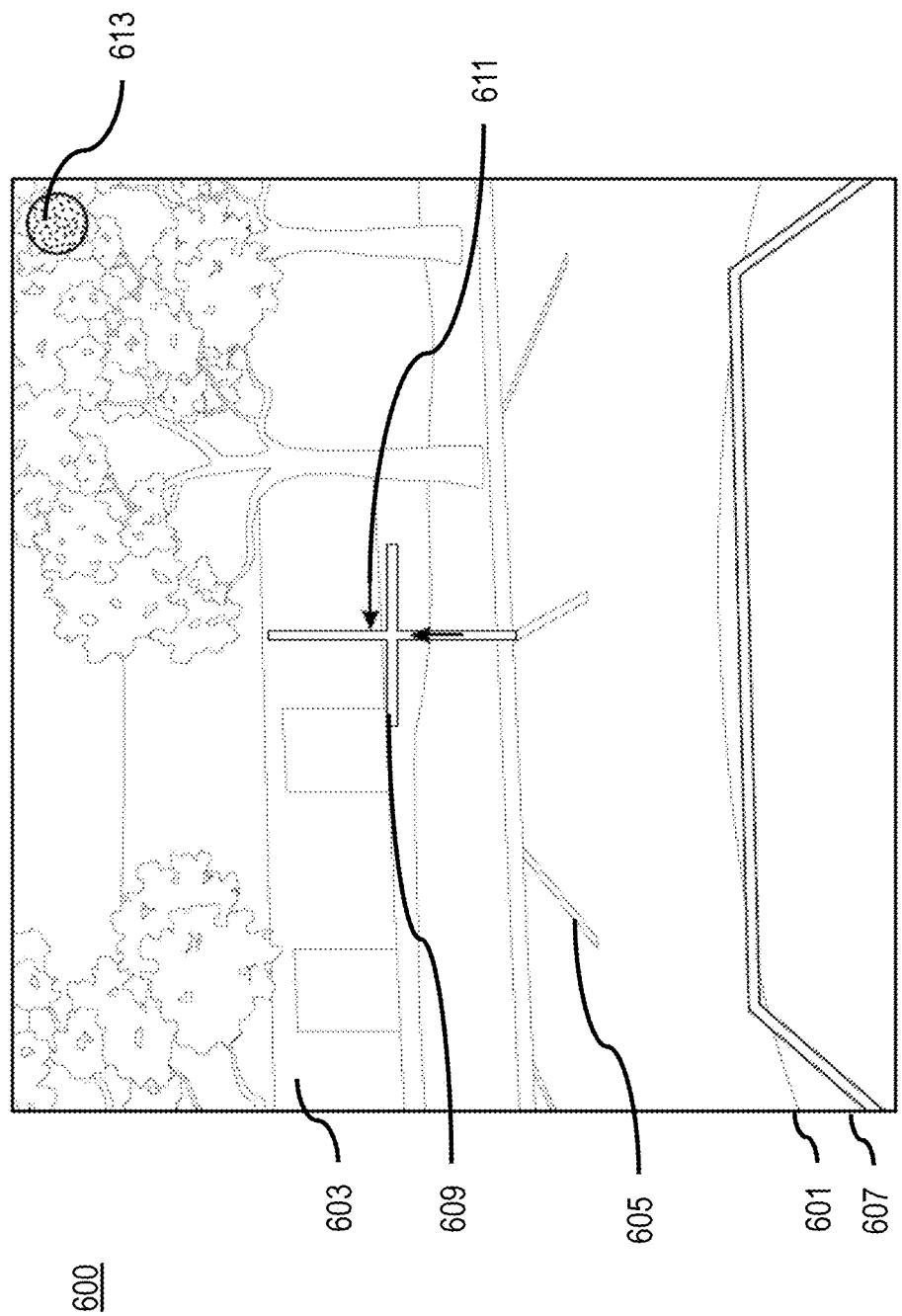
FIG. 6 is a diagram of a user interface of the device illustrating an alignment template on the device, according to one embodiment.

FIG. 6 illustrates a diagram of a user interface 600 of the device 101 illustrating an alignment template on the device. In this example, the user interface 600 displays an imagery data (e.g., a front view scene) of the vehicle 103, which is captured from a source (e.g., a camera mounted on a device 101 in a vehicle 103, other imaging systems). The imagery data includes objects such as a hood 601 of the vehicle 103, a building 603, parking lots, 605, etc. Further, an alignment template is presented as an overlay on the perceived front view scene illustrating the imagery data. The alignment template includes guidelines (e.g., yellow lines) indicating a target alignment of the device 101. As seen in the FIG. 6, bottom yellow lines 607 indicates the hood 601 of the vehicle 103 to aid a user to use the hood 601 of the vehicle 103 to align the device 101 in a correct orientation for capturing the imagery data. Further, the cross-hairs 609 in the center of the imagery data indicate the level of alignment of the device 101 with respect to the perceived scene correct alignment. A green arrow 611 indicates that the alignment of the device 101 is acceptable with respect to the target alignment. In case, the alignment is not acceptable, then a red arrow is displayed on the objects such as the cross-hairs 609, the hood 601 of the vehicle 103. Also, a green circle 613 is displayed at top right of the user interface 600, which indicates an acceptable alignment of the device 101. In another embodiment, the color of the circle may change to red in case the alignment of the device 101 does not meet the criteria of the alignment template.

Figure 7:
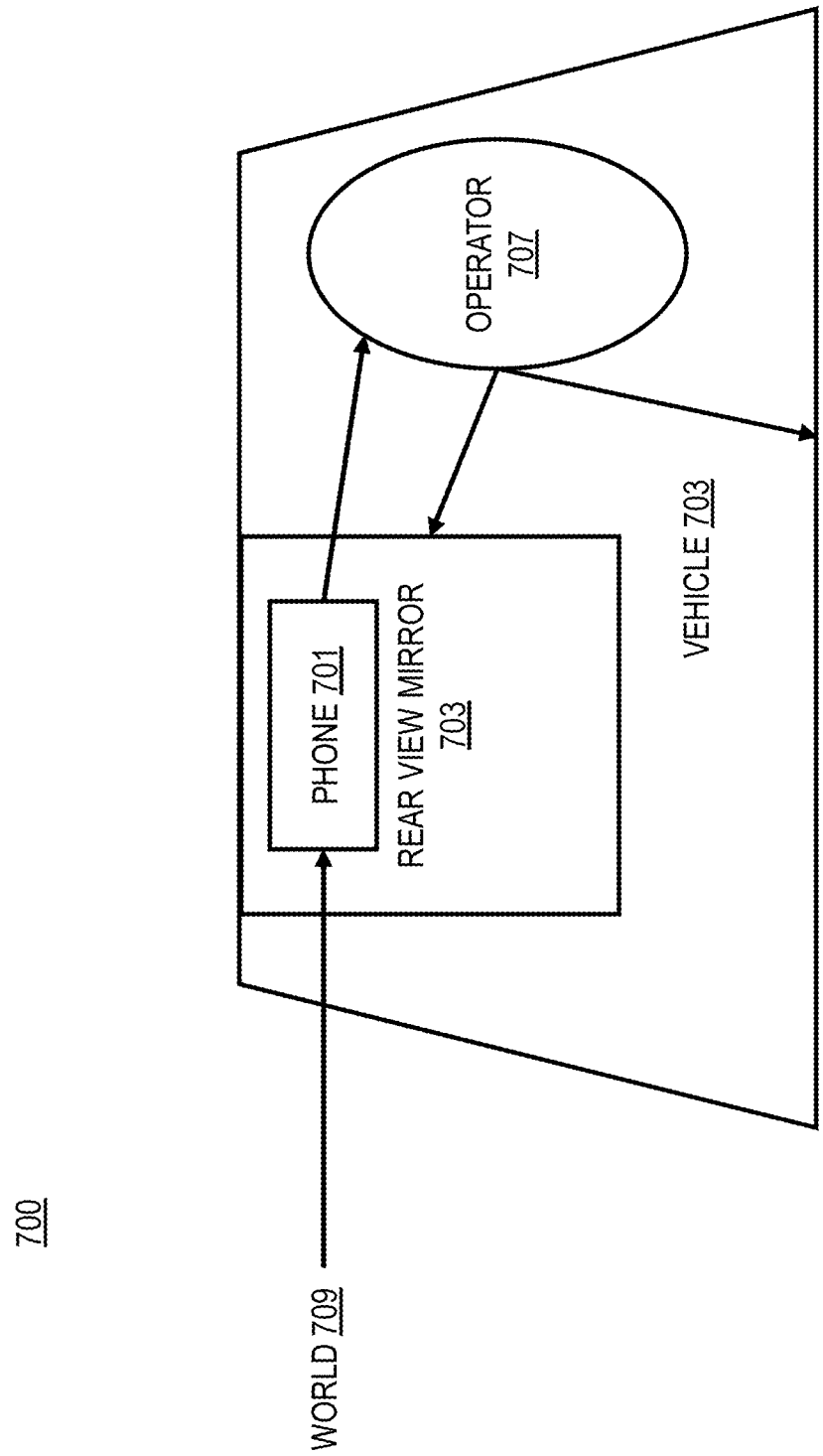
FIG. 7 is a diagram illustrating a perspective view of a vehicle dash board illustrating a phone mounted on a rear-view mirror of the vehicle, according to one embodiment.

FIG. 7 is a diagram illustrating a perspective view 700 of a vehicle dash board illustrating a phone mounted on a rear-view mirror of the vehicle, according to one embodiment. As seen in the FIG. 7, the phone 701 is mounted on a rear view mirror of the vehicle 705. An application (e.g., application 111) of the phone 701 captures front view imagery data from the world 709 from the inside of the vehicle 703. The captured imagery data can be seen by an operator 707 of the vehicle 705. The operator 707 of the vehicle 703 have the actuation control of the vehicle 703. During an initial alignment mode of operation, an alignment template is displayed on the user interface of the phone 701. By using the alignment template, the operator 707 adjusts the alignment or position of the phone 701 in order to align the phone's orientation and/or alignment within the alignment template displayed on the phone. When the phone 701 is aligned at a correct position, the initial alignment mode of operation is completed. Further, the application of the phone 701 then initiates an active alignment mode of operation. In the active alignment mode of operation, the phone 701 initiate capturing additional imagery data that may be used by the map service providers to provide digital maps to users for services such as navigation.

Figure 8:
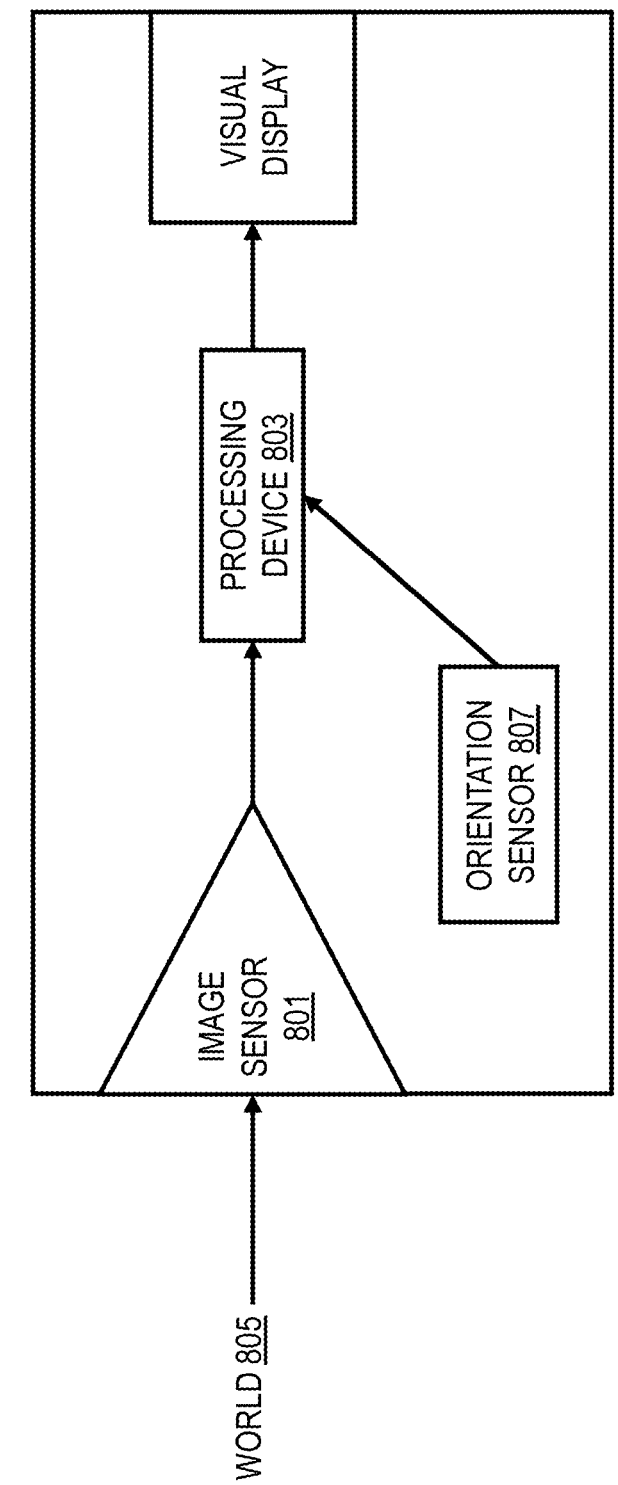
FIG. 8 is a diagram of a hardware for processing imagery data captured from a device, according to one embodiment.

FIG. 8 is a diagram of a hardware 800 for processing imagery data captured from the device to determine an optimal alignment of a device in a vehicle, according to one embodiment. An image sensor 801 captures imagery data of an area of interest from the world 805. The image sensor 801 may be a component of a processing device or a vehicle. The imagery data is then fed to a processing device 803 for processing the imagery data. The processing device 803 may be a phone, a camera, or any other hardware that may be utilized to process the captured imagery data. In one embodiment, the processing device 803 may use machine learning system 113 for processing the captured imagery data. Further, an orientation sensor 807 may be used to determine an orientation of the phone. The measurement received from the orientation sensor 807 is also fed to the processing device 803. The processing device 803 further process the imagery data and the orientation measurement to determine the alignment of the device capturing the imagery data in the vehicle. Further, the processed data is converted to a visualization by the processing device 803, which is displayed by the visual display of 809 of the device. The visual display 809 displays an indicator indicating the optimal alignment of the device for capturing the imagery data.

Returning to FIG. 1, as shown, the system 100 includes the alignment platform 105 which incorporates the machine learning system 113 and computer vision system 121 configured to use machine learning to detect objects or features (e.g., hood of a vehicle) depicted in images that can be used as features for determining optimal alignment of the device. For example, with respect to autonomous, navigation, mapping, and/or other similar applications, the computer vision system 121 can detect sematic features in input imagery data to provide alignment correction of the device 101, according to the various embodiments described herein. In one embodiment, the machine learning system 113 includes a neural network or other machine learning system to make predictions from machine learning models. For example, when the input to the machine learning model are imagery data used for in the embodiments described herein, the output can include pixel locations of photo-identifiable features that can be used to determine the alignment of the device 101. In one embodiment, the neural network of the machine learning system 113 is a traditional convolutional neural network which consists of multiple layers of collections of one or more neurons (which are configured to process a portion of an input image). In one embodiment, the receptive fields of these collections of neurons (e.g., a receptive layer) can be configured to correspond to the area of an input image delineated by a respective a grid cell.

In one embodiment, the machine learning system 113 and/or the computer vision system 121 also have connectivity or access over a communication network 119 to a geographic database 115 which stores the imagery data for different sources (e.g., with different views or perspectives), extracted semantic features, derived maps, etc. generated according to the embodiments described herein. In one embodiment, the geographic database 115 includes of semantic features and/or other related geographic data determined from the device 101. In one embodiment, the machine learning system 113 and/or computer vision system 121 have connectivity over a communication network 119 to the services platform 107 that provides one or more services 109. By way of example, the services 109 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 109 uses the output of the alignment platform 105 (e.g., alignment of device 101, semantic features, etc.) to localize the vehicle 103 or device 101 (e.g., a portable navigation device, smartphone, portable computer, tablet, etc.) and/or provide services 109 such as navigation, mapping, other location-based services, etc.

In one embodiment, the alignment platform 105 may be a platform with multiple interconnected components. The alignment platform 105 may include multiple servers, intelligent networking devices, computing devices, components and corresponding software for identifying semantic features. In addition, it is noted that the alignment platform 105 may be a separate entity of the system 100, a part of the one or more services 109, a part of the services platform 107, or included within the device 101 and/or vehicle 103.

In one embodiment, content providers 117a-117m (collectively referred to as content providers 117) may provide content or data (e.g., including geographic data, parametric representations of mapped features, etc.) to the geographic database 115, the machine learning system 113, the computer vision system 121, the services platform 107, the services 109, the device 101, the vehicle 103, and/or an application 111 executing on the device 101. The content provided may be any type of content, such as map content, textual content, audio content, video content, image content, etc. In one embodiment, the content providers 117 may provide content that may aid in the detecting and classifying semantic features in imagery data and determining alignment of the device 101. In one embodiment, the content providers 117 may also store content associated with the geographic database 115, the alignment platform 105, machine learning system 113, computer vision system 121, services platform 107, services 109, device 101, and/or vehicle 103. In another embodiment, the content providers 117 may manage access to a central repository of data, and offer a consistent, standard interface to data, such as a repository of the geographic database 115.

In one embodiment, the device 101 and/or vehicle 103 may execute a software application 111 to capture image data or other observation data for determining semantic feature or alignment of the device 101 according the embodiments described herein. By way of example, the application 111 may also be any type of application that is executable on the device 101 and/or vehicle 103, such as autonomous driving applications, mapping applications, location-based service applications, navigation applications, content provisioning services, camera/imaging application, media player applications, social networking applications, calendar applications, and the like. In one embodiment, the application 111 may act as a client for the alignment platform 105 and perform one or more functions associated with determining optimal alignment from different image views alone or in combination with the machine learning system 113.

By way of example, the device 101 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the device 101 can support any type of interface to the user (such as "wearable" circuitry, etc.). In one embodiment, the device 101 may be associated with the vehicle 103 or be a component part of the vehicle 103.

In one embodiment, the device 101 and/or vehicle 103 are configured with various sensors for generating or collecting environmental image data (e.g., for processing by the alignment platform 105), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the device 101 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the device 101 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the device 101 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the alignment platform 105, machine learning system 113, computer vision system 121, services platform 107, services 109, device 101, vehicle 103, and/or content providers 117 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
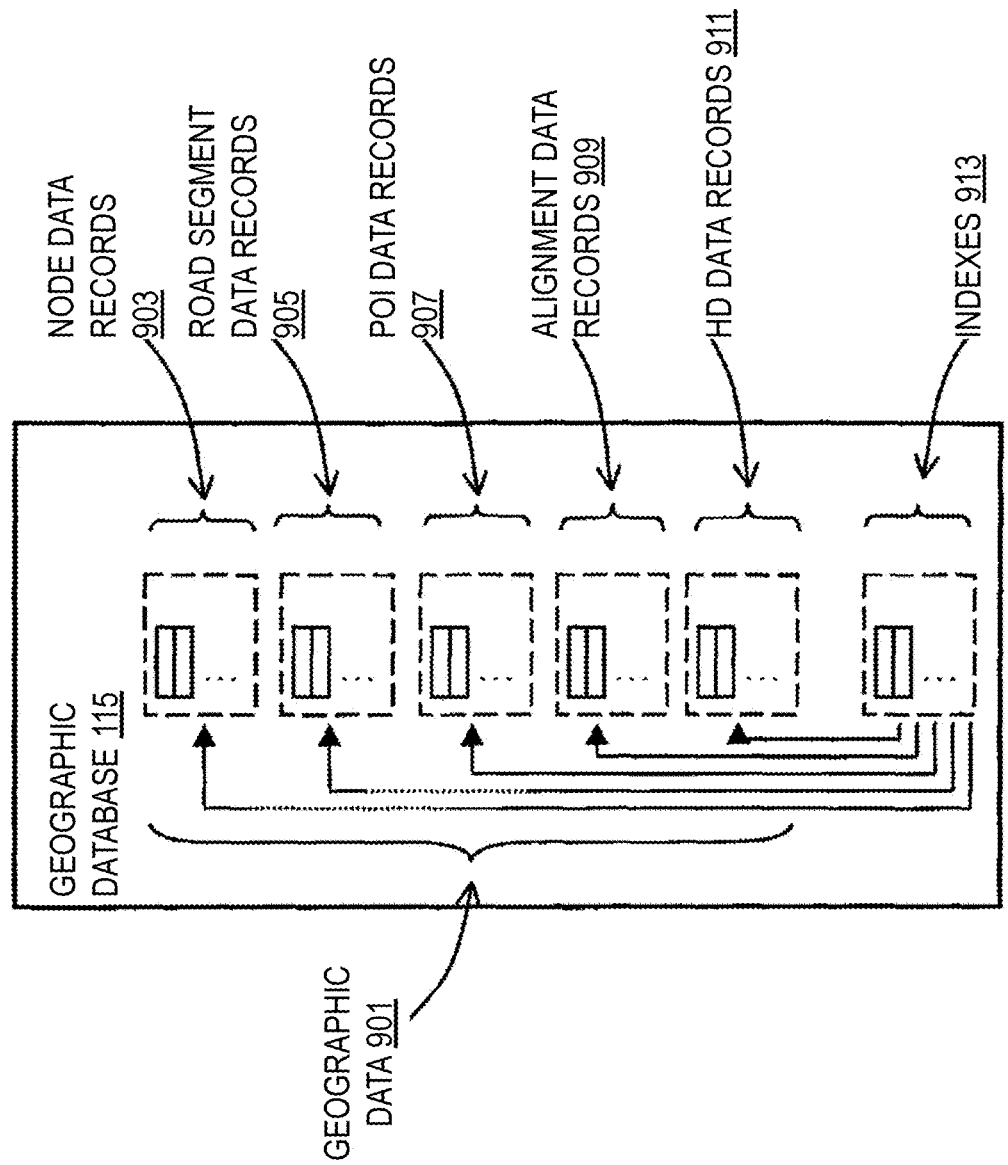
FIG. 9 is a diagram of a geographic database, according to one embodiment.

FIG. 9 is a diagram of a geographic database 115, according to one embodiment. In one embodiment, the geographic database 115 includes geographic data 901 used for (or configured to be compiled to be used for) mapping and/or navigation-related services, such as for video odometry based on the mapped features (e.g., lane lines, road markings, signs, etc.). In one embodiment, the geographic database 115 includes high resolution or high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 903, road segment or link data records 905, POI data records 907, alignment data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 115. In one embodiment, the indexes 913 may be used to quickly locate data without having to search every row in the geographic database 115 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 907. The geographic database 115 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 115 can also include alignment data records 909 for storing the determined alignment of devices as well as other related data used or generated according to the various embodiments described herein. By way of example, the alignment data records 909 can be associated with one or more of the node records 903, road segment records 905, and/or POI data records 907 to support localization or visual odometry based on the determined alignment of the devices stored therein. In this way, the alignment data records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 117 in association with the services platform 107 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicle 103 and/or device 101) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or device 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing feature correspondence based on different image views may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
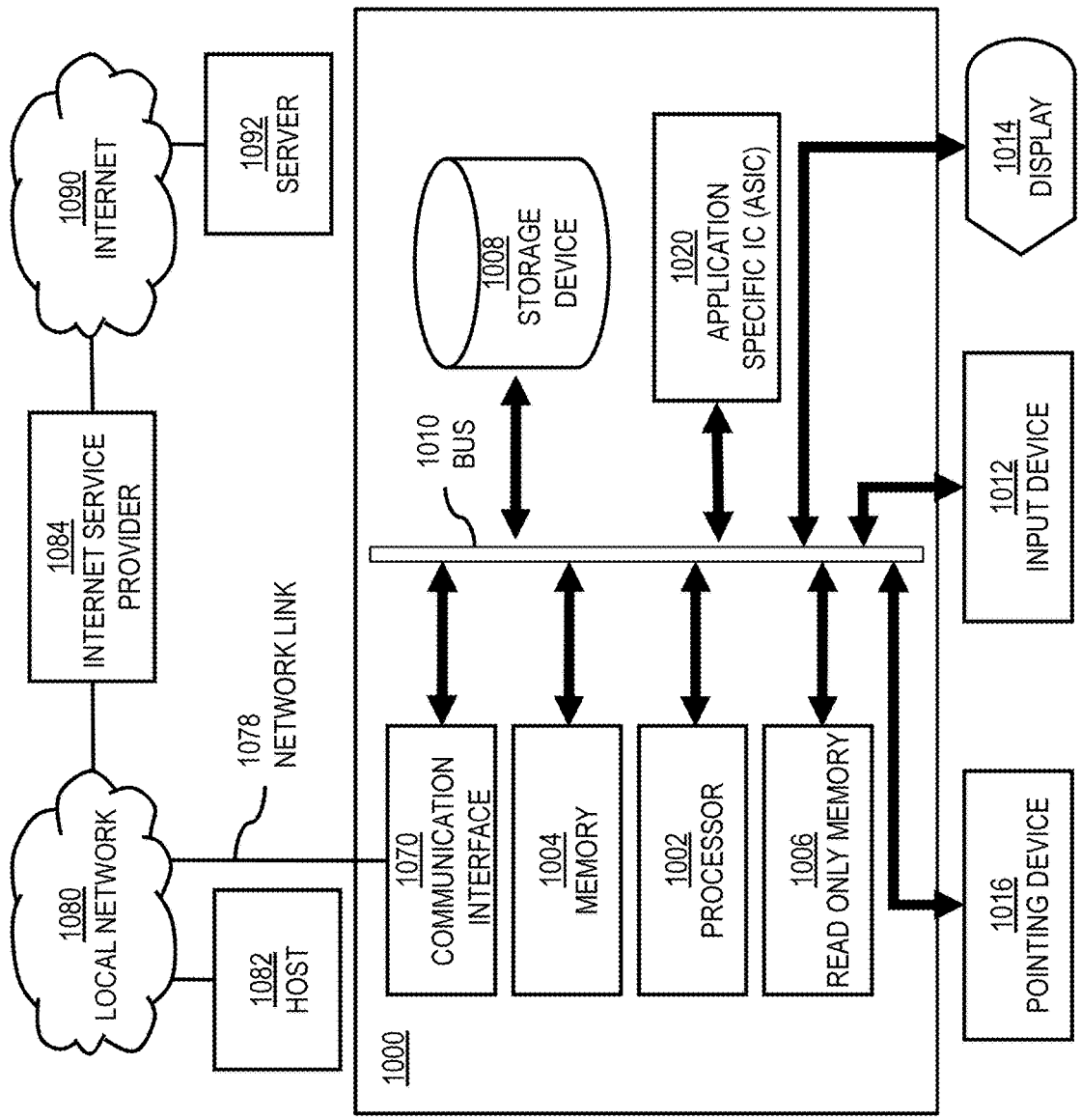
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to provide feature correspondence based on different image views as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to determine optimal alignment of a device in a vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for determining an optimal alignment of a device in a vehicle. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining an optimal alignment of a device in a vehicle, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 1070 enables connection to the communication network 119 for determining an optimal alignment of a device in a vehicle.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to determining an optimal alignment of a device in a vehicle as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determining an optimal alignment of a device in a vehicle. The memory 1105 also stores the data associated with or generated by the execution of the inventive steps.

Figure 12:
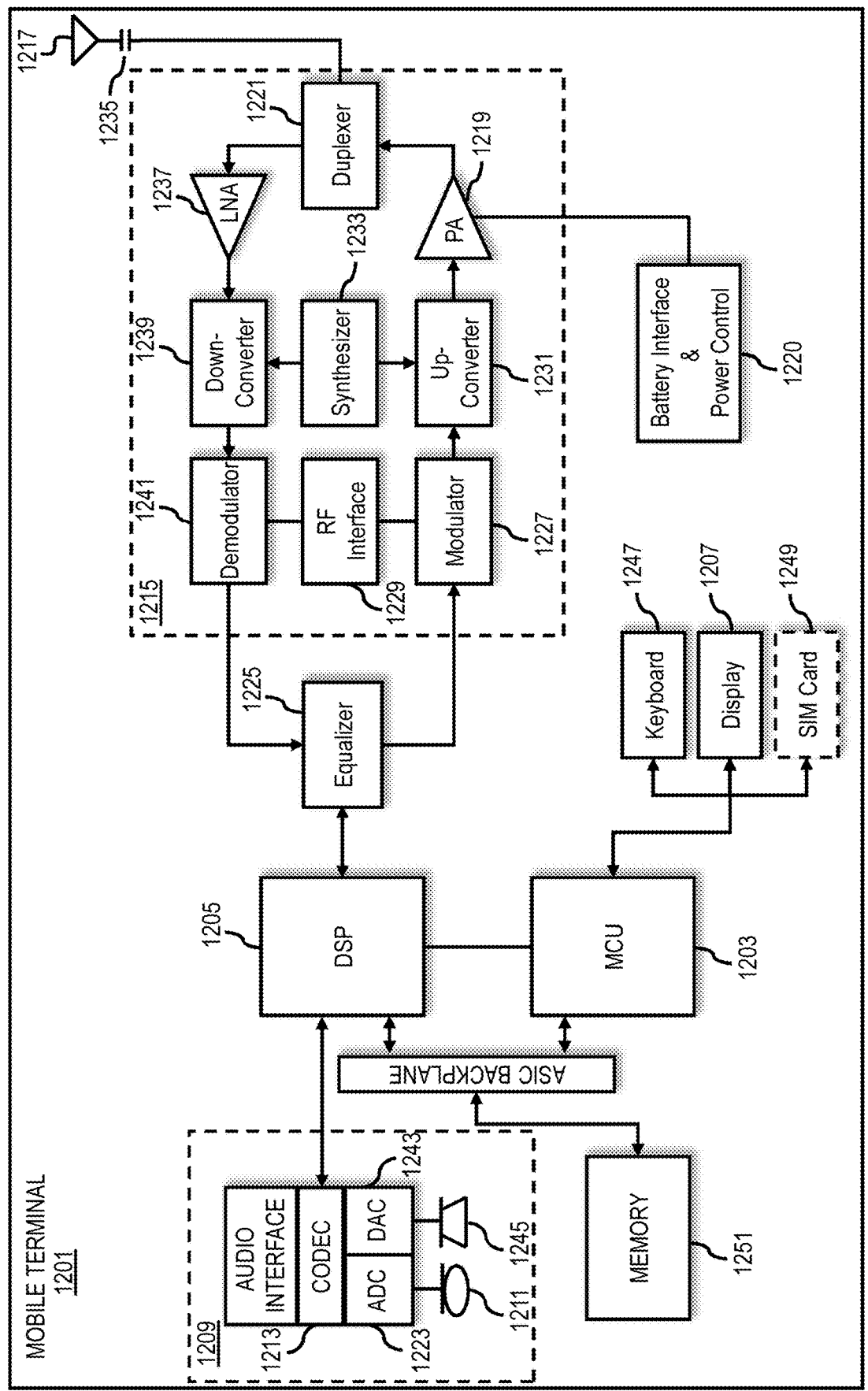
FIG. 12 is a diagram of a mobile terminal (e.g., handset, vehicle, or component thereof) that can be used to implement an embodiment.

FIG. 12 is a diagram of exemplary components of a mobile terminal (e.g., vehicle 103, device 101, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to determining an optimal alignment of a device in a vehicle. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals.

Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving image data from a device mounted in a vehicle;
   generating an alignment template using a machine learning model;
   presenting the alignment template in a user interface of the device as an overlay on the image data, wherein the alignment template comprises a first guideline overlying a vehicle structure included at a lower portion of the image data, and a second guideline comprising a cross-hair shape and included at a center region of the image data for determining a target alignment of the device with respect to the vehicle structure to capture images from the vehicle for an application; and
   processing the image data against the alignment template to determine an alignment of the device in relation to the target alignment.

2. The method of claim 1, wherein the device is mounted to a rear view mirror of the vehicle facing out through the windshield, and wherein the vehicle structure is a hood, a windshield frame, a dashboard, a vehicle frame, a vehicle seat, or windshield wipers of the vehicle.

3. The method of claim 1, wherein the generating of the alignment template, the processing of the image data, or a combination thereof is performed using the machine learning model, and wherein the machine learning model includes a deep neural network.

4. The method of claim 1, wherein the presenting of the alignment template is performed under an initial alignment mode of operation of the application executing on the device.

5. The method of claim 4, further comprising:
   providing data indicating a completion of the initial alignment mode of operation based on determining that the image data indicates that the device alignment matches the target alignment within a threshold alignment value.

6. The method of claim 5, further comprising:
   after the completion of the initial alignment mode of operation, initiating a capture of additional image data from device;
   processing the additional image data to determine that a quality of the additional image data meets a quality criterion associated with the application.

7. The method of claim 6, further comprising:
   initiating an active mode of operation for collecting application image data for the application using the device based on determining that the quality of additional image data meets an image quality criterion.

8. The method of claim 7, wherein the application image data is collected by the application for generating digital map data.

9. The method of claim 5, further comprising:
   after the completion of the initial alignment mode of operation, initiating a periodic alignment check of the device.

10. The method of claim 1, wherein the alignment of the device in relation to the target alignment is determined based on a level of alignment of the vehicle structure with the first guideline in the user interface, and wherein the second guideline presents the level of alignment in the user interface.

11. The method of claim 1, wherein the first guideline corresponds to an image perspective of the device to capture one or more map features from the vehicle for the application.

12. The method of claim 11, wherein the first guideline, the image perspective of the device, or a combination thereof is determined using another machine learning model, and wherein the other machine learning model includes a deep neural network.

13. An apparatus comprising:
   at least one processor; and
   at least one memory including computer program code for one or more programs,
   the at least one memory and the computer program code configured to, with the at least one processor, cause the apparatus to perform at least the following,
   receive image data from a device mounted in a vehicle;
   generate an alignment template using a machine learning model;
   present the alignment template in a user interface of the device as an overlay on the image data, wherein the alignment template comprises a first guideline overlying a vehicle structure included at a lower portion of the image data, and a second guideline comprising a cross-hair shape and included at a center region of the image data for determining a target alignment of the device with respect to the vehicle structure to capture images from the vehicle for an application; and
   process the image data against the alignment template to determine an alignment of the device in relation to the target alignment.

14. The apparatus of claim 13, wherein the device is mounted to a rear view mirror of the vehicle facing out through the windshield, and wherein the vehicle structure is a hood, a windshield frame, a dashboard, a vehicle frame, a vehicle seat, or windshield wipers of the vehicle.

15. The apparatus of claim 13, wherein the generating of the alignment template, the processing of the image data, or a combination thereof is performed using the machine learning model, and wherein the machine learning model includes a deep neural network.

16. The apparatus of claim 13, wherein the presenting of the alignment template is performed under an initial alignment mode of operation of the application executing on the device.

17. A non-transitory computer-readable storage medium, carrying one or more sequences of one or more instructions which, when executed by one or more processors, cause an apparatus to perform:

receiving image data from a device mounted in a vehicle;

generating an alignment template using a machine learning model;

presenting the alignment template in a user interface of the device as an overlay on the image data, wherein the alignment template comprises a first guideline overlying a vehicle structure included at a lower portion of the image data, and a second guideline comprising a crosshair shape and included at a center region of the image data for determining a target alignment of the device with respect to the vehicle structure to capture images from the vehicle for an application; and processing the image data against the alignment template to determine an alignment of the device in relation to the target alignment.

18. The non-transitory computer-readable storage medium of claim 17, wherein the device is mounted to a rear view mirror of the vehicle facing out through the windshield, and wherein the vehicle structure is a hood, a windshield frame, a dashboard, a vehicle frame, a vehicle seat, or windshield wipers of the vehicle.

19. The non-transitory computer-readable storage medium of claim 17, wherein the generating of the alignment template, the processing of the image data, or a combination thereof is performed using the machine learning model, and wherein the machine learning model includes a deep neural network.

20. The non-transitory computer-readable storage medium of claim 17, wherein the presenting of the alignment template is performed under an initial alignment mode of operation of the application executing on the device.

* * * * *